US011439965B2

(12) United States Patent
Blaser

(10) Patent No.: US 11,439,965 B2
(45) Date of Patent: Sep. 13, 2022

(54) METHOD FOR PRODUCING COATING MEDIUM COMPOSITIONS BY MEANS OF GRAVIMETRIC METERING WITH MIXING AND ADAPTATION OF THE HEIGHT OF THE STIRRING ELEMENT TO THE LEVEL

(71) Applicant: BASF Coatings GmbH, Münster (DE)

(72) Inventor: Alexander Blaser, Muenster (DE)

(73) Assignee: BASF Coatings GMBH, Münster (DE)

( * ) Notice: Subject to any disclaimer, the term of this patent is extended or adjusted under 35 U.S.C. 154(b) by 45 days.

(21) Appl. No.: 16/982,978

(22) PCT Filed: Mar. 22, 2019

(86) PCT No.: PCT/EP2019/057275
§ 371 (c)(1),
(2) Date: Nov. 2, 2020

(87) PCT Pub. No.: WO2019/180223
PCT Pub. Date: Sep. 26, 2019

(65) Prior Publication Data
US 2021/0299624 A1    Sep. 30, 2021

(30) Foreign Application Priority Data
Mar. 22, 2018   (EP) ..................................... 18163341

(51) Int. Cl.
*B01F 35/21*  (2022.01)
*B01F 27/231*  (2022.01)
(Continued)

(52) U.S. Cl.
CPC ...... *B01F 35/2117* (2022.01); *B01F 27/2312* (2022.01); *B01F 35/2112* (2022.01);
(Continued)

(58) Field of Classification Search
CPC .............. B01F 2101/30; B01F 27/2312; B01F 35/2117; B01F 35/2112; B01F 35/2206; B01F 35/221422; B01F 35/881
(Continued)

(56) References Cited

U.S. PATENT DOCUMENTS 5,371,329 A * 12/1994 Fillaud .................... B01F 31/20
                                                            177/245
2016/0089643 A1* 3/2016 Schuhbeck ......... B01F 27/1125
                                                            366/182.2
2018/0257052 A1* 9/2018 Saranow .............. A45D 44/005

FOREIGN PATENT DOCUMENTS

CN            204352800 U     5/2015
CN            204544042 U     8/2015
(Continued)

OTHER PUBLICATIONS

International Search Report for corresponding International Patent Application No. PCT/EP2019/057275, dated Jun. 27, 2019, 2 pages.

*Primary Examiner* — David L Sorkin
*Assistant Examiner* — Noor F Ahmad
(74) *Attorney, Agent, or Firm* — Armstrong Teasdale LLP

(57) ABSTRACT

The present disclosure relates to a method for preparing a coating material composition or a precursor thereof, the method including at least step (1), weighing out all required components into a suitable container by means of at least one metering valve when using a gravimetric metering system, the components that are weighed out into the container being mixed by means of at least one stirring body throughout step (1) and a continuous adaptation of the position of the at least one stirring body to the respective filling level within the container taking place throughout step (1), the respective filling level being predetermined by the amount and number of components that are weighed out into the container and the position of the at least one stirring (Continued)

body corresponding to the height of the stirring body within the container, calculated from the bottom of the container.

15 Claims, 2 Drawing Sheets

(51) Int. Cl.
    *B01F 35/88* (2022.01)
    *B01F 35/22* (2022.01)
    *B01F 35/221* (2022.01)
    *B01F 101/30* (2022.01)

(52) U.S. Cl.
    CPC .. *B01F 35/2206* (2022.01); *B01F 35/221422* (2022.01); *B01F 35/881* (2022.01); *B01F 2101/30* (2022.01)

(58) Field of Classification Search
    USPC ...... 366/18, 141, 151.1, 153.1, 286; 177/52, 177/57, 60
    See application file for complete search history.

(56) References Cited

FOREIGN PATENT DOCUMENTS

| | | |
|---|---|---|
| DE | 202005015439 U1 | 12/2005 |
| DE | 102009044205 A1 | 5/2010 |
| WO | 2013098913 A1 | 7/2013 |
| WO | 2013098959 A1 | 7/2013 |

\* cited by examiner

METHOD FOR PRODUCING COATING MEDIUM COMPOSITIONS BY MEANS OF GRAVIMETRIC METERING WITH MIXING AND ADAPTATION OF THE HEIGHT OF THE STIRRING ELEMENT TO THE LEVEL

CROSS-REFERENCE TO RELATED APPLICATIONS

This application is a U.S. National Phase application of PCT/EP2019/057275, filed on Mar. 22, 2019, which claims the benefit of priority to European Patent Application Number 18163341.3, filed Mar. 22, 2018, the entire contents of which are hereby incorporated by reference herein.

The present invention relates to a method for preparing a coating material composition or a precursor thereof that can be used in the automobile industry, the method comprising at least step (1), that is weighing out all the components required for preparing the coating material composition or the precursor thereof into a container suitable for weighing them out by means of at least one metering valve when using a gravimetric metering system, the components that are weighed out into the container being mixed by means of at least one stirring body throughout the course of carrying out step (1) and a continuous adaptation of the position of the at least one stirring body to the respective filling level within the container taking place throughout the course of carrying out step (1), the respective filling level being predetermined by the amount and number of components that are weighed out into the container and the position of the at least one stirring body corresponding to the height of the stirring body within the container, calculated from the bottom of the container.

PRIOR ART

Nowadays, coating material compositions that can be used in the automobile industry are in most cases prepared manually, both on a (large) industrial scale and on a laboratory scale in the course of the preceding development phase.

This manual procedure that is still common practice today is due to the necessity that, in the preparation of many such coating material compositions, such as for example water-based paints, continuous mixing of the components used for preparation is required as a result of changes in viscosity occurring during the metering, in particular whenever both hydrophilic and hydrophobic components are used. In the worst case, there may otherwise be a loss of individual components while they are added, for example when admixing a hydrophilic component to a hydrophobic mixture. Continuous mixing by means of stirring is therefore not only required after all the components have been added, but already at every time when they are added, in order to ensure a constant vortex throughout this time as a result of the donut effect during the mixing.

For partial processes, such as for example for adding pigment pastes, sometimes automated metering systems are also used for preparing these coating material compositions. Irrespective of whether the metering is performed manually or in an automated manner by means of metering systems, preparation is usually based on a gravimetric procedure, i.e. the metering of the components is performed by weighing, i.e. by determining weights within the mixing container used for preparation. It is problematic in this respect however that, in the case of such gravimetric metering, it is usually at least not possible to perform mixing by means of stirring throughout the entire time when the individual components are being added. In particular, stirring is usually not possible during the fine gravimetric metering of individual components, since otherwise metering mistakes can occur while adding them, because the stirring motion disturbs the weighing or interferes with the weigher signal. As a consequence of this, the stirring has to be stopped at least during the final phase of the metering, which however is disadvantageous because of the occurrence of changes in viscosity within the composition to be prepared for the reasons already stated above, to be precise in particular whenever the preparation of water-based paints for example is performed only on a comparatively small scale within research and development laboratories.

Moreover, when preparing such compositions, which necessarily has to be performed while stirring, irrespective of whether the metering is performed in an automated manner by way of metering systems or manually, all relevant stirring parameters during the course of the metering for each component used of a specific formula of a specific target formulation must be tried and tested and defined in advance, in order to make it possible for stirring also to be performed during the metering. Such a relevant stirring parameter is the indication of the vertical position of the stirring body used of the stirring mechanism in the liquid column, which during the time of the metering is dependent on the filling level within the container into which metering is carried out for the purpose of preparing the target formulation. One disadvantage of this procedure, however, is that, as mentioned above, such a relevant stirring parameter has to be known in advance for each specific formula of a specific target formulation, and therefore has to be manually determined experimentally in each case, which requires a great amount of time and work to be expended. The necessary predetermination and specification of absolute stirring parameters also has the consequence that they must be newly determined and specified in each case for every batch size or amount of sample. For example, for an aimed-for final amount of sample of 10 liters or alternatively a batch size of 1000 liters, the required heights of the stirrer, during the individual metering positions must be determined in advance. However, because of varying demand for the aimed-for amount of the target formation, these order quantities are subject to fluctuations, for example of 3, 5 or 7 liters in the laboratory or 100 liters or 500 liters in production. This has the consequence that, for each possible batch size or amount of sample, the process parameters, in particular the stirring parameters, must be determined and known and must be subsequently updated in the order preparation. It is not possible to respond to new order quantities required at short notice, since then the relevant process parameter is no longer correct for the amended formula and metering errors can therefore occur, or operational safety cannot be ensured for the stirring. For this reason, it has also been the case so far that the degree of automation in the preparation of automobile paints is still at a very low level and the manual procedure predominates, since no absolute indications are required in production and it is often possible to respond with empirical values to production instructions that are only general. Problematic in this respect however is the limitation in the call for automation, by for example the use of metering systems, and the limitation with respect to standardization, since the actual process parameters of the stirring process, such as the height of the stirrer or the rotational speed, are not logged, i.e. there are no absolute setpoint/actual values, values of the specifications or documentation thereof.

There is therefore the need for a method for preparing a coating material composition or a precursor thereof that can be performed by means of gravimetric metering of the components required for its preparation, but at the same time allows uninterrupted mixing at all times in preparation, including during the metering of the individual components, and makes sure there is sufficient flexibility with regard to changes within work preparation, production and formula preparation and ensures the quality of the necessary mixing and incorporation of components while stirring, without risking the occurrence of metering errors.

Problem

One problem that the present invention addresses is therefore that of providing a method for preparing coating material compositions or precursors thereof that is performed by means of gravimetric metering of the components required for its preparation and also allows uninterrupted mixing of the individual components at all times in preparation, even during the metering, without thereby having any of the disadvantages of conventional methods, and makes sure there is sufficient flexibility with regard to changes within work preparation, production and formula preparation and ensures the quality of the necessary mixing and incorporation of components while stirring, without risking the occurrence of metering errors. One problem that the present invention addresses in particular is that of providing such a method that makes the preparation of water-based paints possible, to be precise in particular within research and development laboratories. At the same time, the method is also intended to meet the requirements encountered in industry from aspects of safety at work.

Solution

This problem is solved by the subjects that are claimed in the patent claims and also the preferred embodiments of these subjects that are described in the description which follows.

The first subject matter of the present invention is therefore a method for preparing a coating material composition or a precursor thereof that can be used in the automobile industry, the method comprising at least step (1), that is (1) weighing out all the components required for preparing the coating material composition or the precursor thereof into a container suitable for weighing them out by means of at least one metering valve when using a gravimetric metering system, wherein the components that are weighed out into the container are mixed by means of at least one stirring body throughout the course of carrying out step (1) and a continuous adaptation of the position of the at least one stirring body to the respective filling level within the container takes place throughout the course of carrying out step (1), the respective filling level being predetermined by the amount and number of components that are weighed out into the container and the position of the at least one stirring body corresponding to the height of the stirring body within the container, calculated from the bottom of the container.

Step (1) is preferably performed in an automated manner, in particular by means of software support.

It has surprisingly been found that the method according to the invention can be performed with gravimetric metering of all the components used and, on the basis of the filling level determined, uninterrupted mixing of the individual components can be ensured at all times in preparation, during the metering and/or in any breaks in metering. The continuous adaptation of the height of the stirring body within the container, calculated from the bottom of the container, is possible in particular by an automated and filling-level-dependent movement of the stirring body within the container. This makes it possible to dispense with manual control of the height of the stirring body by the person preparing the composition, such as a member of the laboratory staff.

It has also surprisingly been found that, by means of the method according to the invention, it is possible to respond to the potentially occurring changes in viscosity during the metering by the continuous adaptation of the height of the stirring body within the container, in particular when both hydrophilic and hydrophobic components are used, such as for example in the preparation of water-based paints.

At the same time, the method according to the invention surprisingly makes it possible to maintain a constant vortex within the container used for preparation, which is required for optimum mixing of all the components. This is made possible in particular by a continuous adaptation of the position of the stirring body to the respective filling level within the container taking place throughout the course of carrying out step (1), the respective filling level being predetermined by the amount and number of components that are weighed out into the container and it being possible for this to be determined in particular on the basis of the weigher signal. Further surprising advantages of this way of carrying out the method arise as a result of shorter time periods that are then possible for preparation, since experimental determination and definition of the position of the stirring body used of the stirrer during the mixing is not required before the metering. Apart from the advantages already mentioned above in terms of quality in the preparation method or the prepared composition or precursor thereof, there is also a resultant advantage in terms of profitability as a result of the more economical way in which the method is conducted.

Furthermore, there are also surprisingly advantages with regard to an increase in safety when working with the method of preparation, since it is possible by means of the method according to the invention, and in particular the continuous adaptation of the position of the stirring body to the respective filling level within the container, to avoid what could be described as operation with the stirring body exposed. This is understood as meaning in the case of a method of preparation by means of mixing all the components in a container a state in which the stirring body is not completely wetted by the medium to be stirred, and is therefore at least partially above the filling level of the container. Especially from the aspect of operating in zones where there is a risk of explosion, various hazard potentials may occur. To be mentioned by way of example here is a possible rupture of the stirring shaft due to inadmissible vibrations being induced (mechanical source of ignition), the no longer provided electrical discharge, uncontrolled spraying, possibly involving unwanted wetting of sources of ignition, unwanted atomization of flammable liquids and, associated with that, the increased formation of further zones where there is a risk of explosion and the possibility of the formation of sources of ignition. Since a continuous adaptation of the position of the stirring body to the respective filling level within the container takes place throughout the course of carrying out step (1) of the method according to the invention, this can be prevented by means of the method according to the invention.

DETAILED DESCRIPTION

Method According to the Invention

Figure 1:
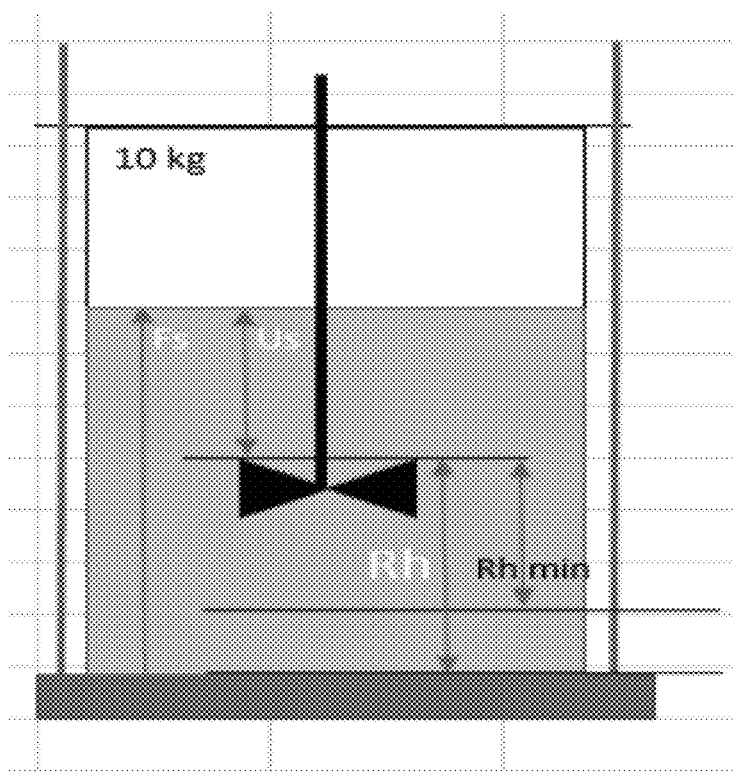
FIG. 1 illustrates a container in accordance with the present disclosure.

The method according to the invention is a method for preparing a coating material composition or a precursor thereof that can be used in the automobile industry. Both coating material compositions that can be used in OEM production-line painting and coating material compositions that can be used in repair painting can be prepared by this method. The same applies to corresponding precursors.

Preferably, the method according to the invention is used in the development of coating material compositions or precursors thereof that can be used in the automobile industry, preferably within laboratories such as research and development laboratories. However, use of the method according to the invention in large-scale technical production is also equally possible.

Coating material compositions that can be used in the automobile industry are for example electrodeposition paints, primers, fillers, base coats, in particular water-based paints, top coats including clear coats, in particular solvent-based clear coats. Preparation of water-based paints is particularly preferred The term base coat is known to a person skilled in the art and is defined for example in the Römpp Lexikon, Lacke and Druckfarben [coatings and printing inks], Georg Thieme Verlag, 1998, 10th edition, page 57. A base coat should accordingly be understood as meaning in particular an intermediate coating substance imparting color and/or imparting color and an optical effect that is used in automobile painting and generally in industrial painting. This is generally applied on a metal or plastic substrate pretreated with a filler or primer, including also directly on the plastic substrate. Pre-existing paintwork, which may still have to be pretreated (for example by rubbing down), may also serve as substrates. It is now quite usual to apply more than one base coat. Accordingly, in such a case a first base coat is the substrate for a second. In order to protect a base coat, in particular from environmental effects, at least one additional clear coat is also applied on top. A water-based paint is an aqueous base coat in which the proportion of water is greater than the proportion of organic solvents, on the basis of the total weight of water and organic solvents in % by weight within the water-based paint.

A precursor of a coating material composition that can be used in the automobile industry is preferably a pigment paste and/or filler paste. The term pigment paste in this case includes color pigment pastes and effect pigment pastes. Precursors also comprise (temporary) semifinished products that can be used for preparing such coating material compositions, in particular of base coats such as water-based paints, such as for example binder and/or additive mixtures. The term pigment paste is known to a person skilled in the art and defined for example in the Römpp Lexikon, Lacke und Druckfarben, Georg Thieme Verlag, 1998, 10th edition, page 452: pigment pastes are preparations of pigment mixtures in carrier materials such as polymers, in which the pigments are contained in a greater concentration than corresponds to the later application. The later application of pigment pastes is generally the preparation of coating material compositions such as base coats. A pigment paste can consequently be distinguished from a coating material composition such as a base coat to the extent that it is merely a precursor for the preparation of such a coating material composition. A pigment paste as such therefore cannot be used itself as a base coat. In pigment pastes, the relative ratio by weight of pigments to polymers is usually greater than in the coating materials for the preparation of which the paste is finally used. Apart from the carrier materials such as polymers, which are also referred to as paste binders, and pigments, usually water and/or organic solvents are also present in the pigment paste. Various additives such as wetting agents and/or thickeners may also be used in a pigment paste. An effect pigment paste is a pigment paste that contains at least one effect pigment as a pigment. A person skilled in the art is familiar with the term effect pigments. A corresponding definition can be found for example in the Römpp Lexikon, Lacke und Druckfarben, Georg Thieme Verlag, 1998, 10th edition, pages 176 and 471. A definition of pigments in general and further specifications thereof are set out in DIN 55943 (date: October 2001). Preferably, effect pigments are pigments that impart a visual effect or a color and visual effect, in particular impart a visual effect. The terms "pigment that imparts a visual effect and a color effect" "pigment that imparts a visual effect" and "effect pigment" are therefore preferably interchangeable.

The method according to the invention is a method for preparing a coating material composition or a precursor thereof that can be used in the automobile industry. It comprises at least step (1), but may also include still further optional steps.

Step (1) of the Method According to the Invention

Step (1) provides weighing out all the components required for preparing the coating material composition or the precursor thereof into a container suitable for weighing them out by means of at least one metering valve when using a gravimetric metering system, the components that are weighed out into the container being mixed by means of at least one stirring body throughout the course of carrying out step (1) and a continuous adaptation of the position of the at least one stirring body to the respective filling level within the container taking place preferably at all times throughout the course of carrying out step (1), the respective filling level being predetermined by the amount and number of components that are weighed out into the container and the position of the at least one stirring body corresponding to the height of the stirring body within the container, calculated from the bottom of the container.

Solutions or dispersions are preferably used as corresponding components.

The weighing out according to step (1) of the method according to the invention is a form of metering. This is performed according to step (1) by using a gravimetric metering system. Preferably, the entire method according to the invention is performed by means of a gravimetric metering system.

The continuous adaptation of the position of the at least one stirring body to the respective filling level within the container is preferably performed such that the at least one stirring body is at all times positioned below the respective filling level and is preferably located with its entire circumference below the respective filling level.

The position of the stirring body corresponds to the height of the stirring body within the container, calculated from the bottom of the container. The optimum position of the stirring body within the container is dependent on the filling level, and is therefore continuously adapted to it by means of the method according to the invention. For example, the higher the filling level, the higher the position of the stirring body within the container, calculated from the bottom of the container. For example, the lower the filling level, the lower the position of the stirring body within the container, calculated from the bottom of the container. The position of the stirring body corresponds to the height $R_h$ of the stirring body within the container, calculated from the bottom of the container. The bottom of the container is in this case at the height h=0 mm.

Preferably, the stirring body is positioned throughout the course of carrying out step (1) such that it is located below the respective filling level for example with at least X=50% for good mixing (FIG. 2), particularly preferably at least X=75% for a combination of good mixing and a good vortex when adding components (FIG. 2), most particularly preferably at least X=95% specifically for an optimum vortex when adding components (FIG. 2) of the circumference of its overall surface area (stirring body).

There is the following relationship between the filling level $F_s$ within the container, measured in [mm] from the bottom of the container, and the height $R_h$ of the stirring body within the container, measured from the bottom of the container in [mm]:

$$R_h = F_s \cdot X$$

X denotes here, as stated above, an indication in percent of what proportion of the stirring body as a percentage is located below the filling level $F_s$.

To make mixing by means of the stirring body possible, it must be at a certain minimum distance from the bottom of the container to allow stirring. $R_{h,min}$ denotes here the deepest possible distance of the stirring body during the mixing with respect to the bottom of the container.

With knowledge of the filling level $F_s$ within the container and the height $R_h$ of the stirring body within the container, measured from the bottom of the container in [mm], the so-called lower level $U_s$ can be calculated according to the following equation:

$$U_s = F_s - R_h$$

The lower level $U_s$ is here the distance of the filling level $F_s$ from the height $R_h$ of the stirring body.

Taking $R_h = F_s \cdot X$ into account, the lower level $U_s$ can consequently be determined according to the following equation:

$$U_s = F_s - R_h = F_s - (F_s \cdot X)$$

X, that is to say the proportion in percent within which the stirring body is below the filling level $F_s$, can then be calculated as $$X = 1 - U_s / F_s.$$

By means of some relative specifications for the value X according to the formula $X = 1 - U_s/F_s$ or for the lower level $U_s$, the height $R_h$ of the stirring body within the container can thus be controlled while carrying out step (1). For example, it is possible to choose a lower level $U_s = 0$ mm initially at the beginning of metering and only to perform an adaptation of $R_h$ to the filling level $F_s$ in the course of carrying out step (1) in an automated manner as from the reaching of a lower level of $U_s \neq 0$, such as for example $U_s = 30$ mm.

The aforementioned relationships are illustrated in FIG. 1.

Figure 2:
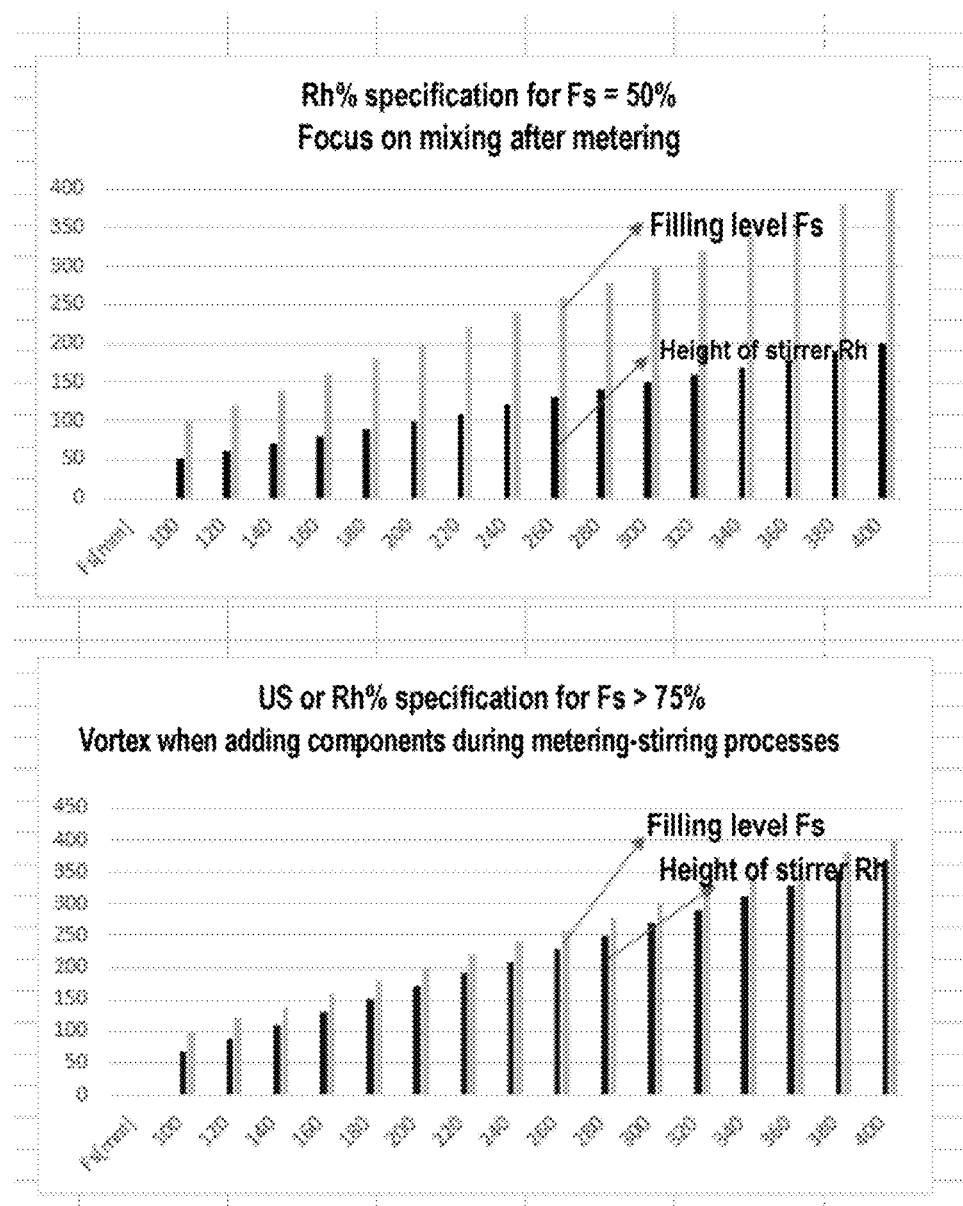
FIG. 2 illustrates the Rh% specification for Fs=50% (top) and US or Rh% specification for Fs>75% (bottom) in accordance with the present disclosure.

By way of example, it is evident from the lower illustration within FIG. 2 that, for an optimum metering-stirring vortex (vortex when adding components) (in FIG. 2 the shorter bar to the left in each case), the height of the stirring body ($R_h$) should be as close as possible to the liquid level $F_s$ (in FIG. 2 the longer bar to the right in each case), but for reasons of operational safety (operation with the stirring body exposed) must always have a certain allowance (lower level value $U_s$) ($U_s = F_s - R_h$). This is compared with an optimum position in the region of about 50% of the liquid level $F_s$, in order to ensure optimum mixing, which by way of example is evident from the upper illustration within FIG. 2.

In particular, the stirring body is positioned completely below the filling level throughout the entire time when step (1) is carried out (plausibility check: X must always be <100%). As a result, operation with the stirring body exposed can be prevented. Preferably, this is checked within step (1), in particular if step (1) is carried out in an automated manner, such as for example by means of software support, so that the carrying out of step (1) can only begin or be continued if the stirring body is below the current filling level.

The mixing achieved by the stirring body according to step (1) of the method according to the invention is performed at a certain rotational speed of the stirring mechanism that includes the stirring body. The rotational speed can be converted into the circumferential speed v by the equation $v = \pi \cdot d \cdot n$, where d corresponds to the diameter of the stirring body, measured in [mm], and n corresponds to the rotational speed, measured in [rpm] (revolutions per minute), of the stirring mechanism.

Preferably, step (1) of the method according to the invention is carried out at a constant rotational speed and/or circumferential speed.

It is possible while carrying out step (1) of the method according to the invention to carry out in addition to the continuous adaptation of the position of the at least one stirring body to the respective filling level within the container a continuous adaptation of the rotational speed and/or the circumferential speed of the stirring mechanism in dependence on the vortex produced within the container by the mixing, the vortex preferably being optically detected by means of a camera. The term vortex is familiar to a person skilled in the art in the field of stirring and mixing technology. It is understood as meaning the flow pattern generated by a stirring mechanism on the surface of the mixed mixture, as on a corresponding liquid surface. The vortex is dependent on the respective filling level and the respective viscosity of the mixture within the container. In order to ensure good mixing during the entire time of the metering, the maintenance of a constant vortex is required or desirable even with a changing filling level and/or changing viscosity. The continuous adaptation of the rotational speed and/or the circumferential speed of the stirring mechanism may be performed in dependence on the vortex within the container produced by the mixing by optical detection of the vortex by means of a camera and preferably digital evaluation of the optical data thus obtained. The digital evaluation in this case preferably includes a comparison of the optical data of the vortex that are obtained with optical comparison data that are contained in a database. In this case, a comparison is preferably made of the recorded images of the stirring vortex with comparison images of stirring vortices contained in the database, which preferably represent an optimum vortex with reference to the respective filling level of the container. The comparison made then allows the vortex existing within the container while step (1) of the method according to the invention is being carried out to be optimized with regard to the mixing of the components present in the container, which takes place by the continuous adaptation of the rotational speed and/or the circumferential speed of the stirring mechanism in dependence on the optical image of the vortex within the container. The comparison images of vortices contained in the database, which preferably represent an optimum vortex with reference to the respective conditions within the container, such as in particular the filling level and/or the viscosity, are therefore preferably linked within the database with items of information regarding the rotational speeds and/or circumferential velocity of the stirring mechanism used that is/are required for optimum mixing. On this basis, a comparison can then be made and the rotational speed and/or the circumferential speed of the stirring mechanism can thus be continuously adapted.

An additional continuous adaptation of the rotational speed and/or the circumferential speed of the stirring mechanism in dependence on the vortex within the container produced by the mixing is not absolutely necessary, however, since a continuous adaptation of the position of the at least one stirring body to the respective filling level within the container is already sufficient for carrying out step (1) of the method according to the invention, in particular if the method according to the invention is used within laboratories such as research and development laboratories.

Preferably, a component that is later present in the target formulation in a greater quantity than the other components to be used is used as the first component. In this way it can be ensured that the stirring body is positioned completely below the filling level throughout the entire time when step (1) is carried out, since the stirring body is in this case preferably already completely covered, i.e. completely wetted, by the first component, which is already in the container, before the second component is added.

The components weighed out into the container are mixed by means of a stirring body at all times throughout the course of carrying out step (1). Preferably, the stirring body is part of a stirring mechanism, which preferably can be activated, controlled by the operator and operated by a motor such as an electric motor. Stirring bodies of all types can be used. Preferably, the stirring bodies are selected from the group consisting of propellers, angled blades, disks, swash plates, hollow blades, impellers, cross bars, anchors, paddles, grids and toothed disks as well as Lenart disks. The stirring body or bodies may in this case be attached to a stirring shaft. The stirring mechanism is preferably capable of a top rotational speed of up to 1500 rpm. The stirring mechanism is preferably adjustable in height, in particular the stirring shaft, as part of the stirring mechanism, is adjustable in height in order to ensure a continuous adaptation of the position of the stirring body to the respective filling level within the container.

Preferably, the weight of the container used and the components already weighed out into it is determined at all times throughout the course of carrying out step (1). The weight of the preferably empty container used is preferably known before carrying out step (1). The weight of the container used and the components already weighed out into it, i.e. in the case of a container that is empty before carrying out step (1) the sum of the empty weight of the container and the components already weighed out into it, is preferably determined at all times during the course of carrying out step (1).

s Preferably, the container used has an empty weight that is determined before carrying out step (1), and is therefore known. The weight of the container may in this case be determined by means of a weigher, such as an electronic weigher, before carrying out step (1) or be determined before beginning the weighing out according to step (1) by means of the gravimetric metering system that is used. If the container is empty before carrying out step (1), which is preferably the case, the weight thus determined corresponds to the empty weight of the container.

The volume of the interior space of the container used according to the invention is preferably likewise known. In this case, the volume of the interior space of the container is a predefined volume, which can be calculated on the basis of the geometry of the interior space of the container (i.e. the width, height, length, radius and/or diameter), and is therefore known.

Preferably, the container used according to the invention has on its outer side an electronically readable label, such as a barcode, which can be scanned. The label preferably contains at least the information of the empty weight of the container and/or items of information concerning the geometry of the interior space of the container used and/or the volume of the interior space. In this case, the method according to the invention may comprise a further optional step (0), which includes electronic reading of the label of the container. Step (1) of the method according to the invention may then be carried out on the basis of this/these electronically read item(s) of information, in particular if step (1) is carried out by means of software support, in particular the continuous adaptation of the position of the stirring body to the respective filling level within the container.

Preferably, the continuous adaptation of the position of the stirring body to the respective filling level within the container takes place by the respective weight of components that have already been weighed out into the container being determined at all times throughout the course of carrying out step (1) and, with knowledge of the geometry of the interior space of the container used, converted into the filling level within the container at every time.

Particularly preferably, the continuous adaptation of the position of the stirring body to the respective filling level within the container takes, place by (i) the respective weight of the container used and the components already weighed out into it being determined at all times throughout the course of carrying out step (1), (ii) this weight minus the known empty weight of the container being converted into a volume of the components that are in the container and (iii) with knowledge of the geometry of the interior space of the container used, this volume in turn being converted into the filling level within the container at every time.

The determination of the weight of the container used and the components already weighed out into it according to stage (i) may be determined as stated above. The conversion of the weight determined according to stage (i) is converted within stage (ii) with knowledge of and minus the empty weight of the container into a volume of the components that are in the container. This takes place either with exact knowledge of the density of the components that are in the container or with the assumption of a constant density of for example $\rho=1$ g/cm$^3$. Within stage (iii), a conversion is then in turn performed of the volume determined in stage (ii) into the filling level within the container. This conversion takes place with knowledge of the geometry of the interior space of the container used (for example the width, height, length, diameter, radius, volume, etc.).

The position of the stirring body within the container, that is to say the height of the stirring body within the container, calculated from the bottom of the container, can thus be continuously adapted to the filling level by way of a continuous determination of the weight of the components already weighed out into the container, preferably at all times throughout the course of carrying out step (1), and a conversion of this weight into the respective filling level at every particular time throughout the course of carrying out step (1).

Preferably, step (1) is carried out by means of software support, in particular continuous adaptation of the position of the stirring body to the respective filling level within the container.

Preferably, step (1) is performed automatically or in an automated manner. In particular, the continuous adaptation of the position of the at least one stirring body to the respective filling level within the container is performed in an automated manner. This is preferably achieved by means of software support.

Preferably, the weighing out according to step (1) is performed on the basis of a formula of a target formulation, which is created electronically within a database or retrieved from an existing database, preferably an on-line database, and corresponds to the coating material composition or the precursor thereof that is to be prepared. The formula of the target formulation comprises in particular the type, number and amount of the components that are required for preparing the target formulation, and also the sequence in which they are added.

The formula of the target formulation may include further items of information with respect to the preparation of the target formulation, for example generally applicable and production-specific and practical parameters.

Preferably, the electronically readable label, such as the barcode that can be applied to the outer side of the container and scanned, also contains the formula of the target formulation.

EXAMPLES AND COMPARATIVE EXAMPLES

The following examples serve for explaining the invention, but should not be interpreted as restrictive. In particular, it is explained how a continuous adaptation of the position of the stirring body to the respective filling level within the container can be performed.

Example B1

The volume of the interior space of the empty container used in this example before carrying out step (1) of the method according to the invention is $V=\pi \cdot r^2 \cdot h$, where $r=70$ mm and $h=180$ mm$=2\,770\,885$ mm$^3$, that is to say about 2.771 l.

The filling level $h_f$ is in this case calculated at every time components are added. The calculation is based on the knowledge of the volume of the interior space of the components present in the container with the assumption of a density $\rho$ of $\rho=1$ g/cm$^3$ ($=0.001$ g/mm$^3$) using $V=\rho/m$.

In this example, throughout the course of carrying out step (1) of the method according to the invention, altogether 2800 g of components are weighed out into the container. The volume of 300 g of weighed-out components with a density $\rho$ of $\rho=1$ g/cm$^3$ is $V=300$ cm$^3$ (300 000 mm$^3$). The volume of 400 g of weighed-out components with a density $\rho$ of $\rho=1$ g/cm$^3$ is $V=400$ cm$^3$ (400 000 mm$^3$). By analogy, the volume can thus be determined at every time. In the following table, the resultant figures for the volume are given by way of example for every 100 g (middle column). The filling level $h_f$ is then obtained in the present case from $h_f=V/\pi \cdot r^2$, where the respectively determined volume is used for V and, as mentioned above, r is 70 mm. In the case of 300 g of weighed-out components, a volume of 300 000 mm$^3$ thus gives a filling level $h_f$ of 19.5 mm. In the case of 400 g of weighed-out components, a volume of 400 000 mm$^3$ thus gives a filling level $h_f$ of 26.0 mm. By analogy, the filling level can be determined at every time. In the following table, the filling levels respectively obtained are given by way of example for every 100 g (right-hand column).

TABLE

Determination of the filling level according to the measured weigher value in g

| Assumption | Density | 1 g/ml |
|---|---|---|
| Coltrol calc | 2 770 885 mm$^3$ | Mliters |
| /1000- | 2770.88 cm$^3$ | ml |
| /1000- | 2.77 | dm$^3$ |

Formula: V = P1 * r2 * h

| in g | Total 2.5 ltr 2 770 885 | r[mm] 70 mm$^3$ | h 180 180 |
|---|---|---|---|
| 300 | 300 000 | mm$^3$ | 19.5 |
| 400 | 400 000 | | 26.0 |
| 500 | 500 000 | | 32.5 |
| 600 | 600 000 | | 39.0 |
| 700 | 700 000 | | 45.5 |
| 800 | 800 000 | | 52.0 |
| 900 | 900 000 | | 58.5 |
| 1000 | 1 000 000 | | 65.0 |
| 1100 | 1 100 000 | | 71.5 |
| 1200 | 1 200 000 | | 78.0 |
| 1300 | 1 300 000 | | 84.4 |
| 1400 | 1 400 000 | | 90.9 |
| 1500 | 1 500 000 | | 97.4 |
| 1600 | 1 600 000 | | 103.9 |
| 1700 | 1 700 000 | | 110.4 |
| 1800 | 1 800 000 | | 116.9 |
| 1900 | 1 900 000 | | 123.4 |
| 2000 | 2 000 000 | | 129 9 |
| 2100 | 2 100 000 | | 136.4 |
| 2200 | 2 200 000 | | 142.9 |
| 2300 | 2 300 000 | | 149.4 |
| 2400 | 2 400 000 | | 155.9 |
| 2500 | 2 500 000 | | 162.4 |
| 2600 | 2 600 000 | | 168.9 |
| 2700 | 2 700 000 | | 175.4 |

In the present example, consequently, the lowest shown filling level is 19.5 mm (when adding 300 g of components) and the highest shown filling level is 175.4 mm (when adding 2700 g of components). The position of the stirring body is in each case below the determined filling level at every time components are added.

Example B2

In example B2, a thickener solution is metered into an empty container according to step (1) of the method according to the invention. The metering is in this case investigated after each addition of 100 g in a range from 100 g to 2800 g. The density is 1.15 g/ml.

The lowest possible distance $R_{h,min}$ of the stirring body during the mixing with respect to the container bottom is in this case $R_{h,min}=1.2$ mm. A constant circumferential speed v of 2.09 m/s is specified for the mixing (denoted in the following table as vR).

As illustrated within example B2 and in the following table, the method according to the invention makes it possible to choose a lower level $U_s=0$ mm initially at the beginning of metering and only to perform an adaptation of $R_h$ to the filling level $F_s$ in the course of carrying out step (1) in an automated manner as from the reaching of a lower level of $U_s=30$ mm.

In the present example, mixing is only performed after an automated plausibility check that is made possible by means of the method according to the invention. When adding the first 200 g of the thickener solution, at first there is no mixing. In the column "Start stirrer V?", the expression "No" is correspondingly entered automatically according to a stored logic check "Start stirrer V"=yes only if $F_s>=R_{h,min}$. Since, however, the addition of the first 200 g gives a filling level Fs<12 mm, the stirrer must not start, which is ensured automatically in accordance with a control logic. Only when a further 100 g are added up to the total amount of 300 g is the condition for admissible starting of the rotational movement of the stirrer $F_s \geq R_{h,min}$ or $U_s \geq 0$ mm satisfied. As from 300 g of thickener solution, mixing is then performed with a constant circumferential speed v of 2.09 m/s. In the column "Start stirrer V?", the expression "Yes" is correspondingly entered automatically. Consequently, this enquiry can also be simply implemented in the corresponding control logic and activation provided automatically. As more and more thickener solution is added, the filling level $F_s$ in the container increases. As from reaching a lower level $U_s$ of 30 mm, a second plausibility enquiry relevant for stirring processes is answered in the affirmative, that is activation of an automatic displacement movement of the stirrer height $R_h$ (X %) in relation to the respective prevailing filling level $F_s$ is provided. In the present example, this is possible as from adding 600 g of thickener solution, and after an automatic logic check "Yes" is correspondingly entered in the column "Rh displaceable?" This may likewise be inquired automatically in accordance with a control logic and activation then provided.

Consequently, it is possible by means of the method according to the invention to provide both stirring of the necessary quality in each case, i.e. the height of the stirrer as a percentage in relation to the filling level for mixing of for example always 50% or always 90% with necessary additions to produce a surface vortex and also all safety-relevant plausibility enquiries, such as the rotational movement of the stirrer (for example only if $U_s$ is at least $\geq 0$ and if activation is provided for an admissible automatic displacing movement of the height, such as, in the example, for example as from $U_s=30$ mm (3 cm) as from the addition of 600 g).

TABLE

Addition of a thickener solution

| g | ml | Fs theo [cm] | Rh (−Rh min) | Start stirrer | Rh displaceable? |
|---|---|---|---|---|---|
| 100 | 87 | 0.55 | −0.65 | NO | NO |
| 200 | 174 | 1.10 | −0.10 | NO | NO |
| 300 | 261 | 1.65 | 0.45 | Yes | NO |
| 400 | 348 | 2.20 | 1.00 | Yes | NO |
| 500 | 436 | 2.75 | 1.55 | Yes | NO |
| 600 | 522 | 3.29 | 2.09 | Yes | Yes |
| 700 | 609 | 3.84 | 2.64 | Yes | Yes |
| 800 | 696 | 4.35 | 3.19 | Yes | Yes |
| 900 | 783 | 4.94 | 3.74 | Yes | Yes |
| 1000 | 870 | 5.49 | 4.29 | Yes | Yes |
| 1100 | 957 | 6.04 | 4.84 | Yes | Yee |
| 1200 | 1043 | 6.59 | 5.39 | Yes | Yes |
| 1300 | 1130 | 7.14 | 5.94 | Yes | Yes |

TABLE-continued

Addition of a thickener solution

| g | ml | Fs theo [cm] | Rh (−Rh min) | Start stirrer | Rh displaceable? |
|---|---|---|---|---|---|
| 1400 | 1217 | 7.69 | 6.49 | Yes | Yes |
| 1500 | 1304 | 8.24 | 7.04 | Yes | Yes |
| 1600 | 1391 | 8.79 | 7.59 | Yes | Yes |
| 1700 | 1478 | 9.33 | 8.13 | Yes | Yes |
| 1000 | 1565 | 9.88 | 8.58 | Yes | Yes |
| 1900 | 1652 | 10.43 | 9.23 | Yes | Yes |
| 2000 | 1139 | 10.98 | 9.78 | Yes | Yes |
| 2100 | 1126 | 11.53 | 10.33 | Yes | Yes |
| 2200 | 1913 | 12.08 | 10.88 | Yes | Yes |
| 2300 | 2000 | 12.63 | 11.43 | Yes | Yes |
| 2400 | 2087 | 13.18 | 11.98 | Yes | Yes |
| 2500 | 2174 | 13.73 | 12.53 | Yes | Yes |
| 2600 | 2261 | 14.28 | 13.08 | Yes | Yes |
| 2700 | 2348 | 14.83 | 13.63 | Yes | Yes |
| 2800 | 2435 | 15.37 | 14.17 | Yes | Yes |

The invention claimed is:

1. A method for preparing a coating material composition or a precursor thereof that can be used in an automobile industry, the method comprising:
    (1) weighing out all required components for preparing the coating material composition or the precursor thereof into a container suitable for weighing them out by means of at least one metering valve of a gravimetric metering system,
    wherein the required components are mixed by means of at least one stirring body throughout step (1) and a continuous adaptation of a position of the at least one stirring body to a respective filling level within the container takes place throughout step (1), the respective filling level being predetermined by an amount and number of the required components that are weighed out into the container and the position of the at least one stirring body corresponding to a height of the at least one stirring body within the container, calculated from a bottom of the container.

2. The method according to claim 1, wherein the continuous adaptation of the position of the at least one stirring body to the respective filling level within the container is performed in an automated manner.

3. The method according to claim 2, wherein the automation is performed by means of software support.

4. The method according to claim 1, wherein a weight of the container and the required components already weighed out into the container is determined at all times during step (1).

5. The method according to claim 1, wherein the container has an empty weight that is determined before carrying out step (1), and is therefore known.

6. The method according to claim 1, wherein the continuous adaptation of the position of the at least one stirring body to the respective filling level within the container takes place by a respective weight of the required components that have already been weighed out into the container being determined at all times throughout step (1) and, with knowledge of a geometry of an interior space of the container, converted into the filling level within the container at every time.

7. The method according to claim 1, wherein the continuous adaptation of the position of the at least one stirring body to the respective filling level within the container takes place by (i) a respective weight of the container and the required components already weighed out into the container being determined at all times throughout step (1), (ii) the weight of step (i) minus a known empty weight of the container being converted into a volume of the required components in the container and (iii) with knowledge of a geometry of an interior space of the container the volume of step (ii) in turn being converted into the filling level within the container at every time.

8. The method according to claim 1, wherein the at least one stirring body is positioned completely below the filling level throughout step (1).

9. The method according to claim 1, wherein the at least one stirring body is part of a stirring mechanism, which can be activated by a motor.

10. The method according to claim 1, wherein the at least one stirring body is attached to a stirring shaft.

11. The method according to claim 10, wherein the stirring shaft is adjustable in height.

12. The method according to claim 1, wherein the weighing out according to step (1) is performed on a basis of a formula of a target formulation, which is created electronically within a database or retrieved from an existing database and corresponds to the coating material composition or the precursor thereof that is to be prepared.

13. The method according to claim 1, wherein an outer side of the container comprises an electronically readable label, which contains information of an empty weight of the container and/or items of information concerning a geometry of an interior space of the container and/or a volume of the interior space of the container.

14. The method according to claim 1, wherein step (1) is carried out at a constant rotational speed and/or circumferential speed.

15. The method according to claim 1, wherein the method is a method for preparing a water-based paint.

\* \* \* \* \*

UNITED STATES PATENT AND TRADEMARK OFFICE
CERTIFICATE OF CORRECTION

| | | |
|---|---|---|
| PATENT NO. | : 11,439,965 B2 | Page 1 of 1 |
| APPLICATION NO. | : 16/982978 | |
| DATED | : September 13, 2022 | |
| INVENTOR(S) | : Alexander Blaser | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 81 days.

Signed and Sealed this
Seventh Day of January, 2025

Derrick Brent
*Acting Director of the United States Patent and Trademark Office*